United States Patent [19]
Cordoba et al.

[11] Patent Number: 5,347,171
[45] Date of Patent: Sep. 13, 1994

[54] EFFICIENT NEGATIVE CHARGE PUMP

[75] Inventors: Michael V. Cordoba; Kim C. Hardee, both of Colorado Springs, Colo.

[73] Assignees: United Memories, Inc., Colorado Springs, Colo.; Nippon Steel Semiconductor Corporation, Chiba, Japan

[21] Appl. No.: 961,439

[22] Filed: Oct. 15, 1992

[51] Int. Cl.⁵ .............................................. G05F 1/56
[52] U.S. Cl. ................................. 307/296.2; 307/270; 307/296.8
[58] Field of Search ............ 307/110, 262, 264, 296.2, 307/296.6, 296.8, 482, 578, 270; 328/176; 363/59, 60, 61, 63

[56] References Cited
U.S. PATENT DOCUMENTS

| | | | |
|---|---|---|---|
| 4,336,466 | 6/1982 | Sud et al. | 307/297 |
| 4,581,546 | 4/1986 | Allan | 307/297 |
| 4,633,106 | 12/1986 | Backes et al. | 307/578 |
| 4,638,464 | 1/1987 | Cranford, Jr. et al. | 365/226 |
| 4,797,899 | 1/1989 | Fuller et al. | 375/7 |
| 4,812,961 | 3/1989 | Essaff et al. | 363/63 |
| 4,883,976 | 11/1989 | Deane | 307/291.2 |
| 5,036,229 | 7/1991 | Tran | 307/497 |
| 5,041,739 | 8/1991 | Goto | 307/296.2 |
| 5,103,191 | 4/1992 | Werker | 331/1 A |

FOREIGN PATENT DOCUMENTS

| | | |
|---|---|---|
| 0030856 | 6/1981 | European Pat. Off. . |
| 0143157 | 6/1985 | European Pat. Off. . |
| 0379454 | 7/1990 | European Pat. Off. . |
| 0389846 | 10/1990 | European Pat. Off. . |
| 0404124 | 12/1990 | European Pat. Off. . |
| 0427084 | 5/1991 | European Pat. Off. . |
| 0450796 | 10/1991 | European Pat. Off. . |
| 0450797 | 10/1991 | European Pat. Off. . |

OTHER PUBLICATIONS

Gillingham et al., "High-Speed, High-Reliability Circuit Design for Megabit DRAM," *IEEE Journal of Solid-State Circuits,* vol. 26, No. 8, pp. 1171-1175 (Aug. 1991).

Martino et al., "An On-Chip Back-Bias Generator for MOS Dynamic Memory," *IEEE Journal of Solid-State Circuits,* vol. SC-15, No. 5, pp. 820-825 (Oct. 1990).

Oto et al., "High-Voltage Regulation and Process Considerations for High-Density 5 V-only E²PROM's," *IEEE Journal of Solid-State Circuits,* vol. SC-18, No. 5, pp. 532-538 (Oct. 1983).

Glasser et al., "5.8 Substrate-bias generation," *Design and Analysis of VLSI Circuits,* pp. 301-308 (Addison-Wesley 1985).

Primary Examiner—Timothy P. Callahan
Assistant Examiner—Shawn Riley
Attorney, Agent, or Firm—Edward D. Manzo

[57] ABSTRACT

A negative charge pump circuit for low voltage and wide voltage range applications. The charge pump includes two single-stage p-type pumps. One of the pumps is used to charge a circuit node down to a threshold voltage $|V_{tp}|$ less than a desired voltage. When used in such a way, the other pump will charge a substrate to a full $-VCC$.

21 Claims, 4 Drawing Sheets

EFFICIENT NEGATIVE CHARGE PUMP

FIELD OF THE INVENTION

The present invention relates to a charge pump and more particularly to an integrated circuit negative charge pump which can pump a substrate to a full −VCC voltage with high efficiency.

BACKGROUND OF THE INVENTION

Charging the substrate of some CMOS or MOS devices to a negative potential has several advantages over a grounded substrate. It lowers the variation of the threshold voltages due to the body effect, increases punch-through voltages, and lowers the diffusion-substrate capacitance (i.e. junction capacitance) without requiring a decrease in the substrate doping. It also protects the chip from forward biasing the substrate due to voltage undershoots at the inputs.

Prior Art Single Stage Pump

Problems addressed by the present invention can be understood by first reviewing various prior art charge pumps and their shortcomings. FIG. 3 shows a single-stage, p-channel transistor, prior art charge pump 65. This is a single-stage pump because it uses only one pumping stage. The single-stage includes a capacitor 64 being charged through a transistor 62 by a power supply and supplying charge to a node 72 through a transistor 70. In FIG. 3, charge pump 65 receives operating voltage VCC and several clock pulses CP1/, CP2, and CP3. It uses them in various ways to affect a central internal circuit node 60 (a first node), and it produces an output ("back bias" voltage) referred to in this illustration as VBB, which can be understood as a voltage lower than VCC.

Briefly, first node 60 is selectively coupled to ground (VSS) by transistor 62 and selectively coupled by a transistor 70 to an output node 72. Node 60 is coupled to one side of a first capacitor 64. Clock input CP1/ is applied to an inverter 66 having an output node 68 which is coupled to the other side of capacitor 64. Node 68 provides clock pulse CP1. Transistor 62 p-channel has a gate electrode which is selectively coupled to VSS through a transistor 74 having its source electrode coupled to a second node 76. Node 76 is also coupled to the gate electrode of transistor 62 and a second capacitor 78. A further p-channel transistor 80 has its gate electrode coupled to second node 76, its drain coupled to VSS, and its source coupled at a third node 82 to a third capacitor 84. Node 82 is coupled to the gate electrode of transistor 70. Finally, a capacitor 73 is coupled between ground (VSS) and output node 72.

In operation, it will be understood that clock pulses CP1, CP2 and CP3 vary between 0 V and VCC. It will be understood that clock pulses CP1, CP2 and CP3, and times T1 to T6 (mentioned infra) are not the same as in the other figures. Clock pulses CP2 and CP3 are non-overlapping active low clocks.

A charge pump of this type will be explained by referring to FIGS. 3 and 4 (a)–(c). VSS is typically 0 V. Prior to time T1 in FIGS. 4 (a)–(c), clock pulse CP2 is active (low) to couple node 60 to VSS (ground) through the source-drain path of transistor 62. Capacitor 64 will be discharged (explained infra) to VSS through the source-drain path of transistor 62. The voltage at node 60 will approach VSS. In the meantime, clock pulse CP1 supplied by inverter 66 to node 68 is inactive (high). Node 68 will then have a voltage of VCC. Therefore, capacitor 64 will charge to −VCC i.e. there will be a voltage drop of −VCC across capacitor 64 from node 60 to node 68.

At time T1, after clock pulse CP2 transitions to the inactive state (high). This turns off transistor 62 and thereby unclamps node 60 from VSS. Next, clock pulse CP1 transitions to the active state (low) at time T2. Node 68 is then clamped to VSS through the ground connection of inverter 66. With node 68 now having a voltage of VSS and capacitor 64 having a voltage drop of −VCC across it, the voltage at node 60 will be forced to drop from VSS to −VCC to maintain the voltage drop across capacitor 64.

Next, clock pulse CP3 transitions to its active state (low) at time T3 to turn on transistor 70. Once on, transistor 70 couples the substrate 72 having a representative load capacitance 73 through the source-drain path of transistor 70 to node 60, which has a voltage −VCC. The voltage at node 72 initially has a voltage VBB, and will discharge through the source-drain path of transistor 70 and node 60 to capacitor 64. The discharge of load capacitance 73 at node 72 to capacitor 64 will decrease the voltage at node 72 and increase the voltage at node 60 the same amount, a voltage ΔV. Thus, the voltage at node 60 has increased to a voltage equal to −VCC+ΔV and the voltage drop across capacitor 64 is (−VCC)+ΔV.

Prior to time T4 in FIGS. 4(a)–(c), clock pulses CP1 and CP3 transition to the inactive state (high). After clock pulse CP3 rises, the voltage at node 82 rises. Transistor 70 is turned off and unclasps node 60 from node 72. After clock pulse CP1 transitions to the inactive state (high), the voltage at node 68 transitions from voltage VSS to voltage VCC. To maintain the voltage drop across capacitor 64 (−VCC+ΔV), the voltage at node 60 must increase. The new voltage at node 60 will equal the old voltage at node 60 (−VCC+ΔV) minus the voltage change on node 68 (−VCC) which equals ΔV. That is, node 60 will follow node 68 by an equal voltage change (VCC) during this time, leaving a voltage of ΔV at node 60 which equals ΔV.

At time T4, clock pulse CP2 transitions to the active state (low) which turns on transistor 62. Node 60 is then clamped to VSS through the source-drain path of transistor 62. Since ΔV>VSS(0 V), capacitor 64 will discharge through node 60 and transistor 62 to VSS. At time T5, clock pulse CP2 transitions to the inactive state (high) to turn off transistor 62.

The foregoing timing explanation has a cycle time duration T6 as shown in FIGS. 4(a)–(c). Cycles having time duration T6 are repeated as explained above to charge a substrate having a load capacitance 73 coupled to node 72.

The circuit in FIG. 3 does not charge the substrate load capacitance load 73 to a full −VCC. To explain in detail, clock pulses CP2 and CP3 are non-overlapping when they are active (low). An active clock pulse CP3 turns transistor 74 on to clamp node 76 to VSS. Since clock pulse CP2 is inactive (high), the voltage drop across capacitor 78 from node 76 to the clock pulse CP2 terminal of capacitor 78 is −VCC (the voltage at node 76) minus VSS. Capacitor 78 is charged to a voltage equal to VSS−VCC or −VCC.

Prior to clock pulse CP2 transitioning to the active state (low), clock pulse CP3 transitions to the inactive state (high) which unclasps node 76 from VSS. Active clock pulse CP2 goes to 0 V (VSS). To maintain the voltage drop of capacitor 78, the voltage at node 76 must transition the same voltage as clock pulse CP2 (VCC−VSS). Node 76 now has a voltage value of −VCC (=VSS −(VCC−VSS)). Transistor 62 will be turned on since −VCC is a threshold voltage $|Vt_p|$ less than the voltage at node 60, which is a minimum of VSS when clock pulse CP1 is inactive (high). Capacitor 64 will discharge through node 60 to a full VSS since the voltage at node 76 is also a threshold voltage $|Vt_p|$ less than the minimum voltage at node 60 (VSS).

Active clock pulse CP2 also turns on transistor 80 which clamps node 82 to VSS. With clock pulse CP3 inactive (high), the voltage drop across capacitor 84 from node 82 to the clock pulse CP3 terminal is VSS−VCC (−VCC). Clock pulse CP2 subsequently transitions to the inactive state (high) to turn off transistors 62 and 80.

Clock pulse CP3 transitions to the active state (low) after clock pulse CP2 transitions to the inactive state (high) and clock pulse CP1 transitions to the active state (low). To maintain the voltage drop VSS−VCC (=−VCC) across capacitor 84, node 82 must also transition the same voltage as clock pulse CP3. Therefore, the voltage of node 82 transitions from VSS to −VCC. The voltage VCC−VCC at node 82 is supplied to and turns on transistor 70 which couples node 60 to node 72. The voltage at node 60 is −VCC (CP1 active) so node 72 discharges through the source-drain path of transistor 70 to node 60 since

VBB > −VCC.

Each cycle (shown as time duration T6 in FIGS. 4(a)−(c)) of the clock pulses CP1, CP2 and CP3 decreases the voltage at node 72 by a voltage ΔV'. To maintain transistor 70 on (since transistor 70 is a p-channel transistor), the voltage at the gate of transistor 70 must be a threshold voltage $|Vt_p|$ less than the voltage of node 72. But, because the voltage at the gate of transistor 70 does not go below −VCC, node 72 will discharge only to a voltage −VCC+$|Vt_p|$. Hence, the substrate with the load capacitance 73 will never achieve a full −VCC. The FIG. 3 circuit is inadequate when a full negative VCC is required.

The efficiency of the FIG. 3 circuit is determined from the relationship $$\text{Efficiency} = \frac{|I_{VBB}|}{|I_{VCC}|}$$

where $I_{VBB}$ is the total current from the substrate during the time required to fully pump the substrate and $I_{VCC}$ is the total current from the power supply VCC during the time required to fully pump the substrate. The efficiency of circuit 65 is theoretically 100%.

Prior Art Two-Stage Pump

On the other hand, a dual-stage, p-channel charge pump may be implemented as shown in FIG. 5. Briefly, one side of a capacitor 100 is coupled to receive a clock pulse CP1. Another side of capacitor 100 is coupled to a node 110. Node 110 is selectively coupled to a power supply providing a voltage VSS through a transistor 114. A gate electrode of transistor 114 is coupled to a node 112. Node 112 is selectively coupled to the power supply providing voltage VSS through transistor 117. Node 112 is coupled to a gate electrode of a transistor 116. Node 112 is coupled to one side a capacitor 104. Another side of a capacitor 104 is also coupled to receive a clock pulse CP2.

Node 110 is selectively coupled to a node 122 through a transistor 120. A gate electrode of transistor 120 is coupled to a node 118. Node 118 is coupled to a gate electrode of transistor 117. Node 118 is selectively coupled to the power supply providing voltage VSS through transistor 116. Node 118 is coupled to a gate electrode of transistor 124. Node 118 is coupled to one side of a capacitor 106. Another side of a capacitor 106 is coupled to receive a clock pulse CP3.

Node 122 is coupled to one side of a capacitor 102. Another side of capacitor 102 is coupled to receive a clock pulse CP1B. Node 122 is selectively coupled to a node 130 through a transistor 128. Node 130 has a capacitive load 132. Node 122 is selectively coupled to a node 126 through a transistor 124. Node 126 is coupled to a gate electrode of transistor 128. Node 126 is coupled to one side of a capacitor 108. Another side of a capacitor 108 is coupled to receive clock pulse CP2.

A first stage of the FIG. 5 circuit comprises the devices on the left of broken line 134. The second stage comprises the devices on the right of line 134. The operation of the first stage of the FIG. 5 circuit mainly involves capacitor 100 receiving charge from the power supply providing voltage VSS through transistor 114, and providing charge through transistor 120. The operation of the second stage mainly involves capacitor 102 receiving charge through transistor 120 and providing charge through transistor 128 to node 130.

Clock pulses CP1, CP1B, CP2 and CP3 vary between 0 V (low) and VCC (high) as seen in FIGS. 6 (a)−(d). It will be understood that clock pulses CP1, CP2 and CP3, and times T1−T7 are not the same as in the other figures. Clock pulses CP2 and CP3 are nonoverlapping, active low clocks. Clock pulses CP1 and CP1B are direct inversions of each other.

A brief explanation of how the capacitors in FIG. 5 become charged is necessary to understand the operation of the FIG. 5 circuit. Prior to power-up, clock pulses CP1, CP1B, CP2 and CP3 are low and capacitors 100, 102, 104, 106 and 108 have no stored charge. No stored charge will cause each capacitor to have a 0 V voltage drop from the terminal coupled to receive the respective clock to a node to which the capacitor is coupled. For example, capacitor 100 will have a 0 V voltage drop from node 110 to the terminal receiving clock pulse CP1. It will be the convention here that the voltage drop of a capacitor will be referenced from the node to which it is coupled, to the terminal of the capacitor that is coupled to the corresponding clock pulse. Also, the sizes of capacitors 100, 102, 104, 106 and 108 are large enough such that their respective internal nodes 110, 122, 112, 118 and 126 will try to couple up or down substantially close to a full $|VCC|$.

At power-up, the clock pulses could be at any time interval shown in FIGS. 6(a)−(d). For example, immediately after power-up, clock pulse CP3 may go low and clock pulse CP2 may be high. The voltage at node 112, which was 0 V before power-up, will try to increase to the same high voltage as clock pulse CP2 since node 112 is capacitively coupled to clock pulse CP2. However, with the voltage at the gate electrode of transistor 117 at 0 V (the voltage at node 118 was 0 V before power-up), the voltage at node 112 can only rise to a threshold voltage $|Vt_p|$. When the voltage at node 112 increases past the threshold voltage $|V_{tp}|$, transistor 117 will turn on to clamp node 112 to $|V_{tp}|$. With the voltage at node 112 at $|V_{tp}|$, transistor 117 will be either off or barely on. While the voltage at node 112 is $|V_{tp}|$ and the voltage of the clock pulse CP2 is high (VCC), capacitor 104 will charge to $|V_{tp}|-$VCC ($<0$).

At some time after clock pulse CP2 goes high, clock pulse CP3 goes high. Node 118 will try to follow clock pulse CP3 to VCC. However, node 118 will rise past $2|V_{tp}|$ at which point transistor 116 will turn on because the voltage at the gate electrode of transistor 116 is $|V_{tp}|$. Node 118 will be clamped to $2|V_{tp}|$ where transistor 116 is either off or barely on. Capacitor 106 will charge to $2|V_{tp}|-$VCC ($<0$). After this occurs, clock pulse CP2 goes low which causes the voltage at node 112 to decrease by $-$VCC to $|V_{tp}|-$VCC ($<0$). The voltage at node 112 will turn on transistor 116 to clamp node 118 to VSS (0 V). Capacitor 106 will charge to a full $-$VCC.

Subsequently, clock pulse CP2 will go high. The voltage at node 112 will increase back to $|V_{tp}|$. Thereafter, clock pulse CP3 will go low. The voltage at node 118 will decrease from 0 V to $-$VCC because of the capacitive coupling of capacitor 106. The voltage at node 118 will turn transistor 116 on to clamp node 112 to VSS (0 V). Capacitor 104 will charge to a full $-$VCC. In a like manner to capacitor 106 charging to a full $-$VCC, capacitor 100 will charge to a full $-$VCC.

As can be seen from FIGS. 6(a) and (d), clock pulses CP1 and CP3 will be active low at some time. The voltages at nodes 110 and 118 will be $-$VCC when clock pulses CP1 and CP3 are active (low) due to capacitive coupling. The voltage at node 118 will turn on transistor 120 to couple node 110 to node 122. But, because the voltage at node 118 is $-$VCC, the voltage at node 122 can attain a minimum voltage of only $-$VCC$+|V_{tp}|$.

With the voltage at node 122 equal to $-$VCC$+|V_{tp}|$, and clock pulse CP1B inactive (high), capacitor 102 will charge to $-$VCC$+|V_{tp}|-$VCC ($-2$ VCC$+|V_{tp}|$). Active clock pulse CP3 also turns on transistor 124 to couple node 122 to node 126. With the voltage at node 122 being $-$VCC$+|V_{tp}|$, transistor 124 will turn on to couple node 122 to node 126. The voltage provided to node 126 is $-$VCC$+|V_{tp}|$. With clock pulse CP2 inactive (high) at this time, capacitor 108 will charge to $-$VCC$+|V_{tp}|-$VCC ($-2$ VCC$+|V_{tp}|$). It will be understood that when clock pulses CP1B and CP2 are active (low), the voltages at respective nodes 122 and 126 will be $-2$ VCC $+|V_{tp}|$.

It will take several cycles of the clock pulses before all of the internal voltages of the nodes and the capacitors reach the required levels for the circuit to pump effectively, since all the internal nodes started at 0 V, including VBB.

FIGS. 6(a)–(d) show the timing of the clocks for the dual-stage p-channel transistor pump. In view of the foregoing explanation of the voltages at the various nodes of FIG. 5, the FIG. 5 circuit will be explained with reference to FIGS. 6(a)–(d). At a time T1 in FIG. 6(c), clock pulse CP2 transitions to its inactive state (high). Nodes 112 and 126 transition from $-$VCC to 0 V and from $-2$ VCC$+|V_{tp}|$ to $-$VCC$+|V_{tp}|$, respectively. Transistors 114 and 122 are turned off which respectively uncouple node 110 from VSS and node 122 from node 130. Also, transistor 116 is shut off and uncouples node 118 from VSS (0 V).

At a time T2 in FIG. 6(a), clock pulse CP1 transitions to its active state (low), which causes node 110 to drop to a theoretical minimum of $-$VCC. Also, at a time T2 in FIG. 6(b), clock pulse CP1B transitions to the inactive state (high) which causes node 122 to increase from $-2$ VCC$+|V_{tp}|+\Delta V$ to $-$VCC$+|V_{tp}|+\Delta V$. $\Delta V$ is the increase in voltage of node 122 due to the pumping of electrons from capacitor 102 to the substrate capacitance 132 prior to CP2 transitioning to the inactive state (high) at T1 in FIG. 6(c).

At a time T3 in FIG. 6(d), a clock pulse CP3 transitions to the active state (low) which causes node 118 to fall to a theoretical minimum of $-$VCC since capacitor 106 is larger than the gate capacitance of transistor 120 and all other parasitic capacitances on node 118. After node 118 decreases to $-$VCC, transistor 120 is turned on and couples node 110 to node 122. Since the voltage on node 110 is $-$VCC and the voltage on node 122 is $-$VCC$+|V_{tp}|+\Delta V$, electrons are transferred from capacitor 100 to capacitor 102 until the voltage at nodes 110 and 122 equalize. Also at this time, transistors 117 and 124 are on. Through the source-drain path of transistor 117, node 112 remains clamped at VSS. With node 112 at VSS (0 V) transistor 114 remains off. Also, through the source-drain path of a transistor 124, nodes 122 and 126 are coupled together. This insures that transistor 128 is off since its voltage gate-to-source (node 126 to node 122) is 0 V.

At a time T4 in FIG. 6(d), clock pulse CP3 transitions to the inactive state (high) which causes node 118 to increase from $-$VCC to a theoretical maximum of 0 V. After node 118 transitions to its maximum voltage, transistor 120 turns off and uncouples nodes 110 and 122 from each other. Also at this time, transistors 117 and 124 are turned off and uncouple nodes 112 from VSS and node 126 from node 122.

At a time T5 in FIG. 6(a), clock pulse CP1 transitions to the inactive state (high), which causes node 110 to increase to a theoretical maximum of $\Delta V$. $\Delta V$ is the change in voltage that occurred due to the transfer of electrons from capacitor 100 to capacitor 102 at a time T3 in FIG. 6(d). Also at this time in FIG. 6(b), clock pulse CP1B transitions to the active state (low) which causes node 122 to decrease to a theoretical minimum of $-2$ VCC$+|V_{tP}|$ in preparation for when the pumping will occur.

At a time T6 in FIG. 6(c), clock pulse CP2 transitions to the active state (low), which causes node 126 to fall to a theoretical minimum of $-2$ VCC$+|V_{tp}|$. This turns on transistor 128 and pumps electronic charge from capacitor 102 to the substrate (capacitive load 132) through a source-drain path of transistor 128. Also at time T6, node 112 transitions to $-$VCC which turns on transistor 114. Node 110 is discharged from $\Delta V$ to VSS(0 V) through a source-drain of transistor 114.

Each cycle (time duration T7 in FIG. 6(a)–(d)) of the clock pulses CP1, CP1B, CP2 and CP3 decreases the voltage at node 130 by a voltage $\Delta V$. Since the gate of transistor 128 (node 126) can attain a minimum voltage of $-2$ VCC$+|V_{tp}|$, then the minimum voltage VBB can attain is $-2$ VCC$+2|V_{tp}|$. Thus, a dual-stage negative charge pump can pump to lower voltages than a single-stage pump.

However, the major disadvantage is that the efficiency decreases by $1/n$ for a negative charge pump, where n equals the number of stages. For a single-stage pump, the efficiency is a theoretical maximum of 100%, and for a two-stage, the theoretical maximum efficiency is 50%.

Therefore, it is a general object of the present invention to overcome the above-mentioned problems.

Another object to the present invention is to pump only to the desired minimum voltage −VCC whereby the present invention can be used unregulated to supply a low enough substrate voltage for low power supply application.

SUMMARY OF THE INVENTION

This invention provides a charge pump circuit generating a minimum voltage of −VCC while still maintaining high efficiency. A preferred embodiment of the present invention includes a single-stage p-channel charge pump and additional circuitry. The additional circuitry eliminates a threshold voltage drop $|Vt_p|$ of the prior art single-stage p-channel charge pump to achieve a full pumped −VCC, while permitting the present invention to realize a higher efficiency than the prior art dual-stage charge pump. The additional circuitry includes a smaller secondary pump to pump a node of the preferred embodiment to a voltage lower than $-VCC+|Vt_p|$. This allows a substrate voltage VBB to reach a minimum of −VCC.

A novel and important aspect of the operation of such charge pump is maintaining −VCC over a wide range of variations of the power supply voltage or with a low power voltage for the power supply while maintaining high efficiency.

Another important aspect of the operation of such a charge pump is the timing is arranged so the capacitor used to supply the charge to the substrate is neither discharged to a power supply providing voltage VSS nor recharged by the charged substrate.

The invention also includes a method for operating a charge pump. A method of operating the charge pump may comprise the steps of: (1) clamping a first node to a power supply voltage VSS; (2) pumping a second node from the first node to a voltage less than the power supply voltage VSS; (3) clamping a third node to the power supply voltage VSS; and (4) pumping a substrate from the third node to a voltage −VCC controlled by the second node.

BRIEF DESCRIPTION OF THE DRAWINGS

The invention, together with its objects and the advantages thereof, may best be understood by reference to the following detailed description taken in conjunction with the accompanying drawings with which.

DETAILED DESCRIPTION OF THE INVENTION

Figure 1:
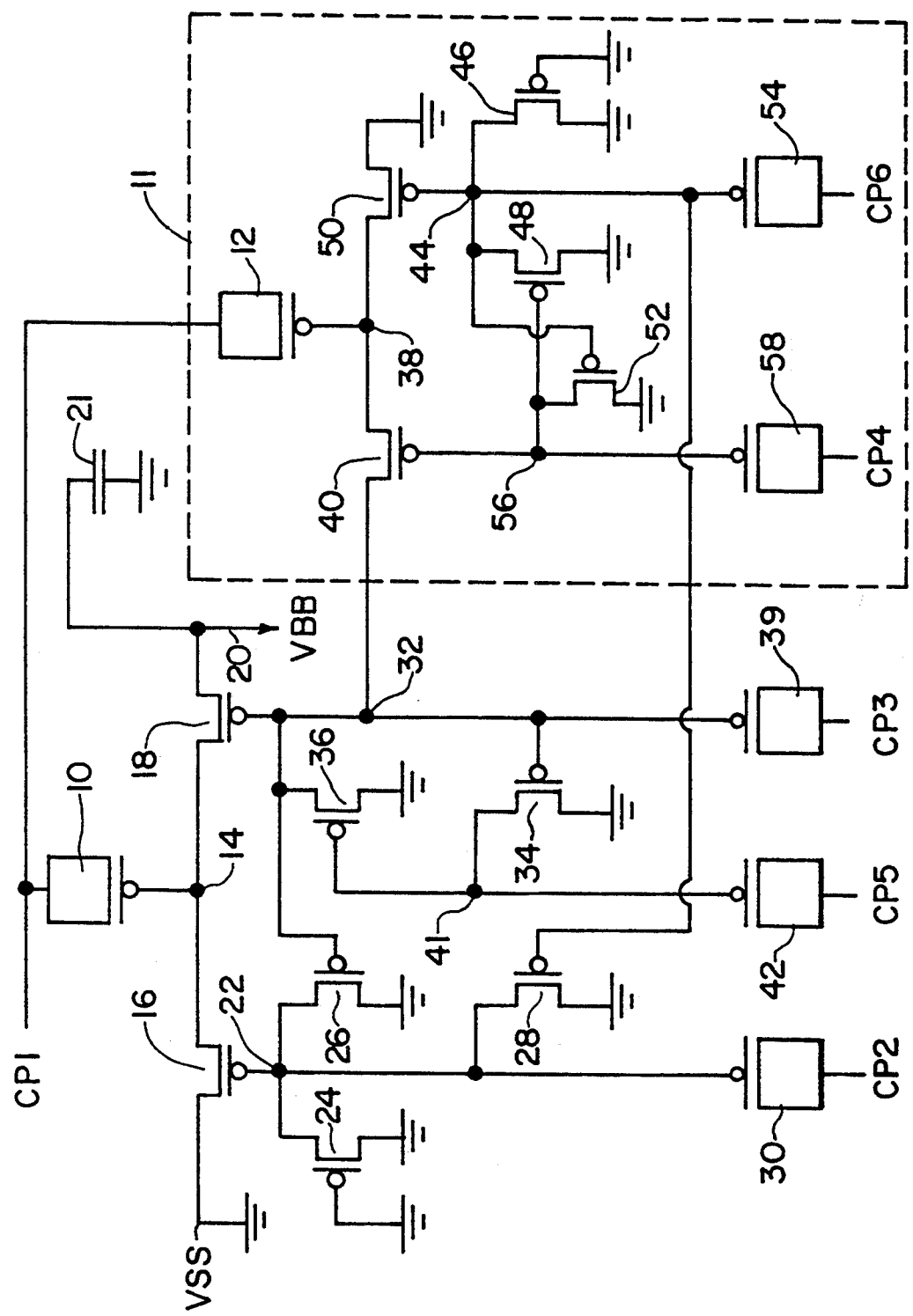
FIG. 1 is a detailed diagram of a circuit embodying the present invention.
Figure 2A:
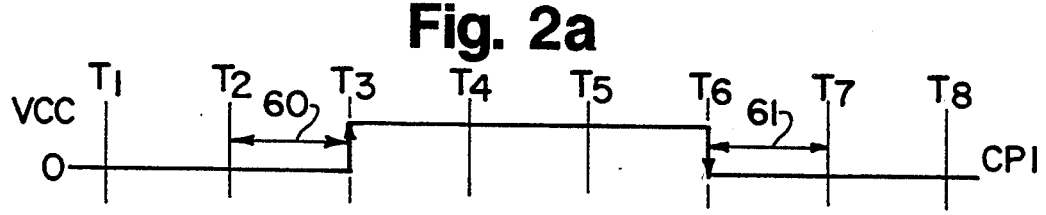
FIGS. 2(a)-(f) are timing diagrams of the operation of the FIG. 1 embodiment.
Figure 2B:
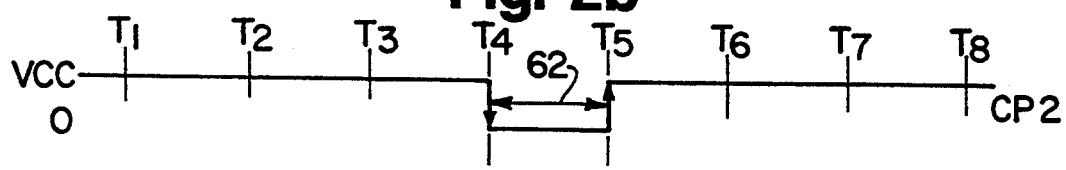
Figure 2C:
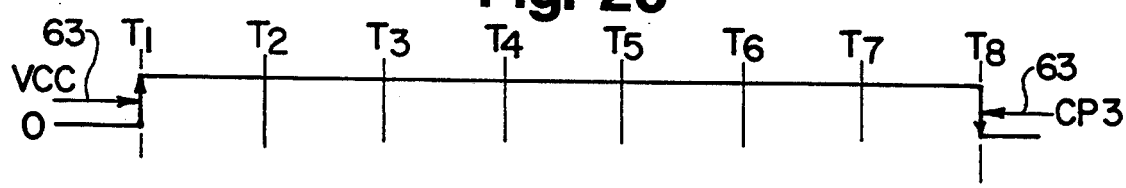
Figure 2D:
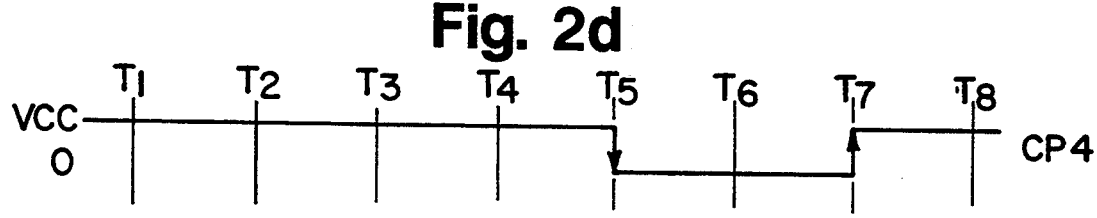
Figure 2E:
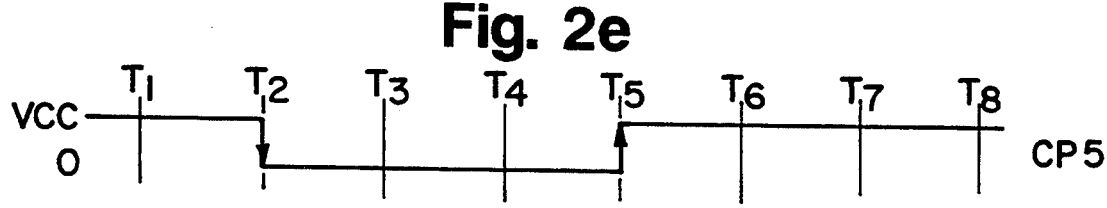
Figure 2F:
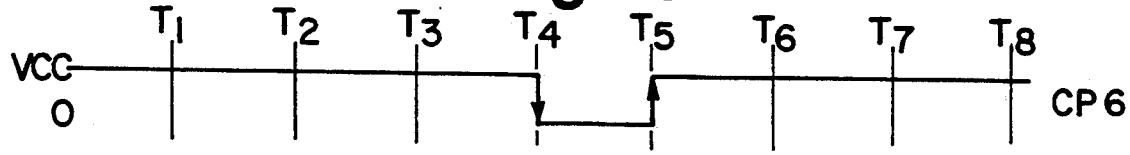
Figure 3:
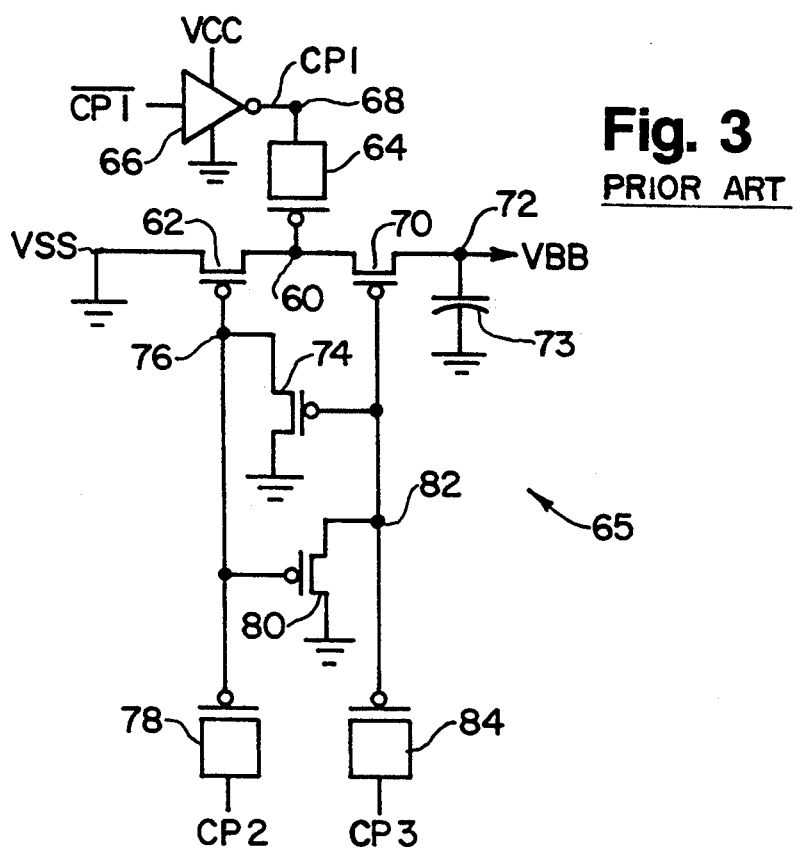
FIG. 3 is a detailed diagram of a prior art p-channel charge pump circuit.
Figure 4A:
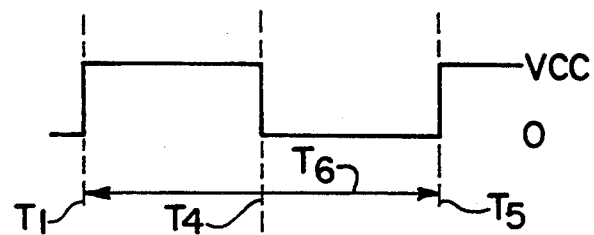
FIGS. 4(a)-(c) are timing diagrams of the operation of the FIG. 3 circuit.
Figure 4B:
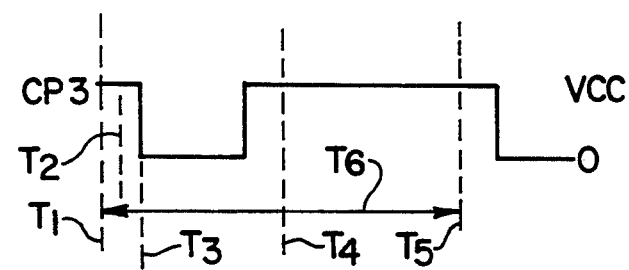
Figure 4C:
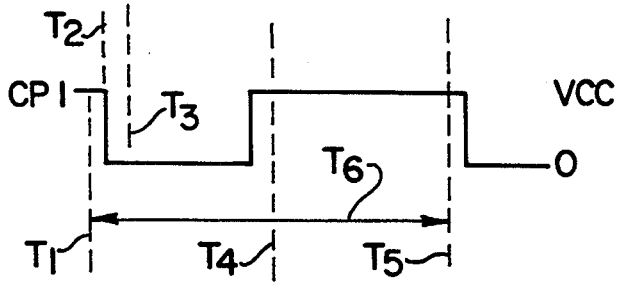
Figure 5:
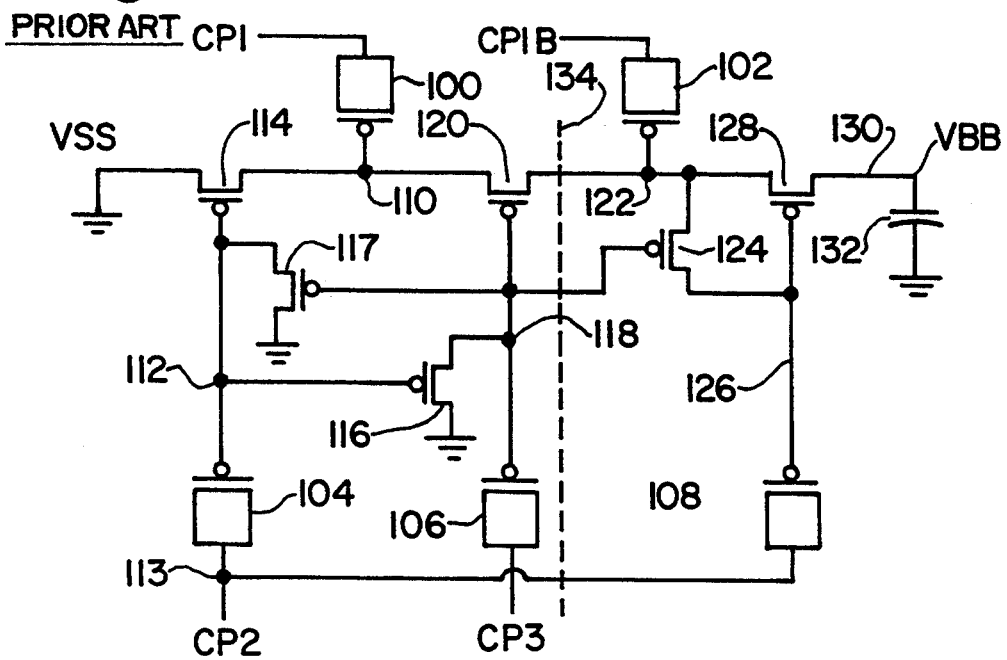
FIG. 5 is a detailed diagram of a prior art p-channel charge pump circuit.
Figure 6A:
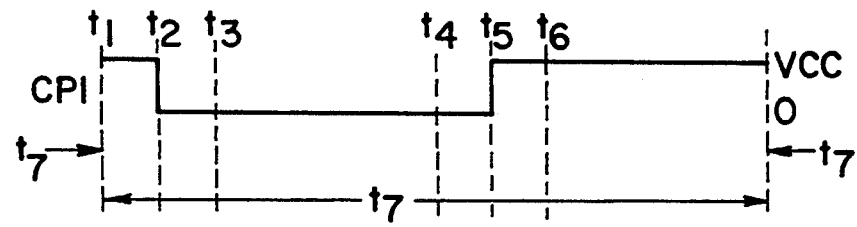
FIGS. 6(a)-(d) are timing diagrams of the operation of the FIG. 5 circuit.
Figure 6B:
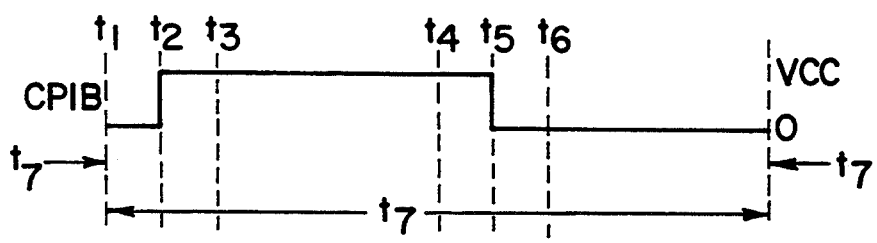
Figure 6C:
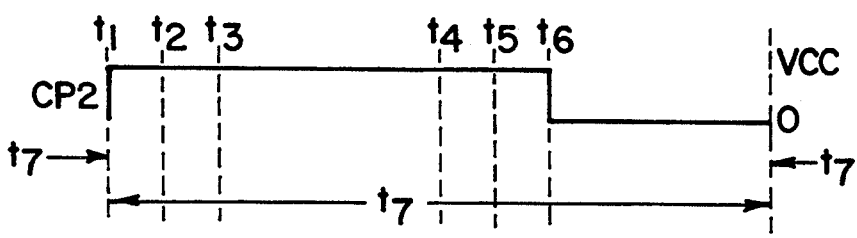
Figure 6D:
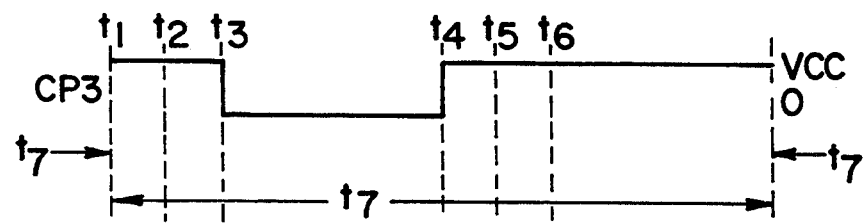

FIG. 1 is a schematic diagram of the preferred embodiment of the present invention. While FIG. 1 uses field effect transistors (FETs), it is to be understood that other kinds of transistors may be suitable. Clock pulses CP1–CP6 vary, for example, between a voltage VCC and 0 V. The FIG. 1 embodiment preferably includes a secondary pump shown by a block 11, and a main pump including the devices external to block 11.

A clock pulse CP1 is supplied to electrodes of capacitors 10 and 12. A node 14 is coupled to another electrode of capacitor Node 14 is selectively coupled to a first power supply, typically 0 volts, through a source-drain path of a transistor 16. We refer to the first power supply voltage as "ground". Node 14 is also selectively coupled through a source-drain path of a transistor preferably to a substrate 20. Substrate 20 has a capacitive load 21. A node 22 is coupled to a gate of transistor 16. Node 22 selectively coupled to ground through source-drain paths of transistors 24, 26 and 28. Node 22 is also coupled to an electrode of a capacitor 30. A gate electrode of transistor 24 is coupled to ground. A clock pulse CP2 is coupled to another electrode capacitor 30.

A node 32 is coupled to gate electrodes of transistors 18, 26 and 34. Node 32 is selectively coupled to the first power supply through a source-drain path of a transistor 36. Further, node 26 is selectively coupled to a node 38 through a source-drain path of a transistor 40. Node 32 is also coupled to an electrode of capacitor 39. A clock pulse CP3 is coupled to another electrode of capacitor 39.

A node 41 is coupled to a gate electrode of transistor 36. Node 41 is selectively coupled to the first power supply through a source-drain path of transistor 34. Node 41 is also coupled to an electrode of capacitor 42. A clock pulse CP5 is coupled to another electrode of capacitor 42.

A node 44 is coupled to a gate electrode of transistor 28. Node 44 is selectively coupled to the first power supply through source-drain paths of transistors 46 and 48. A gate electrode of transistor 46 is coupled to ground. Node 44 is coupled to gate electrodes of transistors 50 and 52. Node 44 is also coupled to an electrode of capacitor 54. A clock pulse CP6 is coupled to another electrode of capacitor 54. A source-drain path of transistor 50 selectively couples node 38 to the first power supply.

A node 56 is coupled to gate electrodes of transistors 40 and 48. Node 56 is also coupled to an electrode of capacitor 58. Node 56 is selectively coupled to the first power supply through a source-drain path of transistor 52. A clock pulse CP4 is coupled to another electrode of capacitor 58.

Capacitors 10, 12, 30, 39, 42, 54 and 58 are preferably p-channel transistors used as capacitors. Each p-channel transistor has its source and drain electrodes shorted together to form one electrode of the capacitor. The gate electrode is the other electrode of the capacitor.

It is intended that nodes 14, 22, 32, 41, 56, 44 and 38 respectively follow clock pulses CP1, CP2, CP3, CP5, CP4, CP6 and CP1. These nodes should operate between, for example, 0 V and −VCC, but node 32 should operate between, for example, 0 V and $-2\text{VCC}+|Vt_p|$.

Operation

A detailed description of the operation of the FIG. 1 embodiment is better understood by referring to FIGS. 2 (a)-(f). It will be appreciated that all of the illustrated transistors of FIG. 1 are p-channel enhancement mode type FETs. They are normally on (conductive) when the gate electrode voltage is low relative to the source electrode. For this reason, the clock signals are "active" in the lower of the two illustrated states (VSS), and "inactive" in the higher state (VCC). For reference clock pulse CP6 can be the same signal or a duplicate signal of clock pulse CP2.

FIGS. 2 (a)–(e) show several times T1, T2 ... T8. Prior to a time T1 in FIGS. 2(a)–(f), node 32 is clamped to VSS through transistor 36 while clock pulse CP2 is inactive (high). The voltage at node 32 will be VSS. While the voltage at node 32 is VSS, clock pulse CP3 is inactive (high). Capacitor 39 thus charges and has a voltage drop from the clock pulse CP3 terminal of capacitor 39 to node 32 of VCC-VSS. Clock pulse CP3 subsequently transitions to the active state (low) while clock pulse CP5 is inactive (high) and transistor 36 is off. To maintain the VCC−VSS voltage drop of capacitor 39, node 32 is driven to a voltage equal to VSS −(VCC−VSS). Typically VSS=0 V, so the voltage at node 32 equals −VCC. This will turn on transistor 18 because of insufficient gate to source voltage, and couple substrate 20 to node 14.

At a time T1, clock pulse CP3 transitions from an active state (low) to an inactive state (high). To maintain the voltage drop across capacitor 39, node 32 will transition to approximately VSS. The voltage VSS at node 32 turns off transistor 18 because of insufficient gate to source voltage, and decouples substrate 20 from node 14. At a time T2, clock pulse CP5 transitions from an inactive state (high) to an active state (low). The timing of clock pulses CP3 and CP5 insures that capacitor 39 through node 32 will not discharge negative charge through transistor 36 while clock pulses CP3 and CP5 are active. With clock pulse CP5 being active (low), transistor 36 turns on to couple node 32 to VSS. Capacitor 39 through node 32 is charged from the power supply providing voltage VSS through turned on transistor 36. After clock pulse CP5 transitions to the active state (low), a preferred time delay 60 (FIG. 2a) is used to insure that the voltage at node 32 equals VSS before clock pulse CP1 changes state at a time T3. This preferred delay is used to prevent transistor 18 from turning on when clock pulse CP1 transitions to the inactive state (high), which would cause electrons to leak out of the substrate 20 through node 14 to capacitor 10.

At time T3, clock pulse CP1 transitions to the inactive state (high), and the voltages at nodes 14 and 38 transition from a negative voltage to a slightly positive voltage (explained infra). At a time T4, clock pulses CP2 and CP6 transition to active states (low). As explained supra for node 32, when clock pulse CP3 transitions to the active state (low), the voltage at nodes 22 and 44 will decrease to −VCC. Transistors 16 and 50 will be turned on. This causes capacitors 10 and 12 via respective nodes 14 and 38 to discharge to VSS via transistors 16 and 50, respectively. A preferred time delay 62 is used to insure substantially full discharge of capacitors 10 and 12 to VSS.

At a time T5, clock pulses CP2, CP4, CP5 and CP6 change state. Clock pulse CP2 and CP6 become inactive (high) before clock pulse CP1 becomes active to prevent the further discharge of capacitors 10 and 12 to VSS by increasing the voltages at nodes 22 and 44 to turn off transistors 16 and 50, respectively. Clock pulse CP5 becomes inactive (high) to unclamp node 32 from VSS by increasing the voltage at node 41 to turn off transistor 36. Clock pulse CP4 becomes active (low) to decrease the voltage at node 56 to −VCC. This allows a negative charging of node 32 by turning on transistor 40 before clock pulse CP1 transitions to the active state (low). It is not necessary for clock pulse CP5 to transition to the inactive state (high) before clock pulse CP4 transitions to the active state (low) since node 32 and node 38 are both at the voltage potential VSS, and no charge transfer will occur until clock pulse CP1 transitions low.

At a time T6, clock pulse CP1 transitions to the active state (low). The voltage at node 38 approaches −VCC since the capacitance of capacitor 12 is large relative to other device capacitances attached or coupled to node 38. Electrons are pumped into node 32 via transistor 40 from node 38. The voltage at node 32 equals $$V_{node32} = \frac{-VCC(C12)}{C12 + C39} \quad (2)$$

where V node 32 is the minimum pumped voltage at node 32, C12 is the capacitance of capacitor 12, C39 is the capacitance of capacitor 39. Equation 2 indicates that the minimum theoretical voltage that node 32 can approach is −VCC if the capacitance of capacitor 12 is much greater than the capacitance of capacitor 39. However, since the gate electrode of transistor 40 reaches only −VCC, then the minimum voltage that node 32 can approach is $-VCC+|Vt_p|$. In actual applications, it is only necessary to set the capacitance of capacitor 12 approximately equal to the capacitance of capacitor 39. The voltage at node 32 would then approach −VCC/2. After clock pulse CP1 transitions to the active state (low), a preferred time delay 61 is used to insure that the voltage on node 32 has reached its lowest value $(-VCC+|Vt_p|$ or $-VCC/2)$ when charge is transferred from capacitor 12 to capacitor 39.

At a time T7, clock pulse CP4 transitions to the inactive state (high) to turn transistor 40 off by increasing the voltage at node 56. This is done in preparation of clock pulse CP3 transitioning to the active state (low) at time T8. With clock pulse CP4 off, the voltage on node 32 is mainly a function of the capacitance of capacitor 39 and the gate capacitance of transistor 18.

At time T8, clock pulse CP3 transitions to the active state (low). The voltage on node 32 drops by another voltage −VCC (since the capacitance of capacitor 39 is much greater than the gate capacitance of transistor 18). Hence, the voltage on node 32 is $-2\ VCC+|Vt_p|$ or −1.5 VCC, depending on whether node 32 was initially charged to $-VCC+|Vt_p|$ or −0.5 VCC at time T6 (again note that this is dependent on the sizes of capacitors 39 and 12). After clock pulse CP3 transitions low, a preferred time delay 63 is used to insure the transfer of electrons from capacitor 10 to substrate 20.

The voltage at the drain of transistor 18 is equal to −VCC (clock pulse CP1 still active) and the voltage at the gate of transistor 10 equals −1.5 VCC or $-2\ VCC+|Vt_p|$. Transistor 18 will stay on while node 14 (capacitor 10) charges substrate 20 to a substantially full −VCC because the gate voltage of transistor 18 is a threshold voltage $|Vt_p|$ less than −VCC.

The efficiency of the FIG. 1 embodiment is determined as follows. The devices included in the secondary pump (as shown in block 9) should preferably be sized to provide a current to node 32 equal to one quarter (¼) of the current the main pump provides to substrate 20. From Equation 1, the efficiency equals $$\text{Efficiency} = \frac{|IVBB|}{|IVCC\text{sub}| + |IVCC\text{node}32|} \quad (3)$$

where IVBB is the positive current leaving substrate 20, IVCCsub is the negative current entering substrate 20 from capacitor 10 through node 14, and IVCC node 32 is the negative current from capacitor 12 through node 38. Assuming that the efficiency of the main pump without the secondary pump is satisfied by Equation 1, then IVCCsub=IVBB. Substituting this equality into Equation 3 and substituting IVCC node 32=0.25 IVCCsub, the efficiency is theoretically 80% (ignoring parasitic capacitances).

It is preferred that transistors 16 and 18 have a larger channel width to length ratio than transistors 40 and 50. The larger ratio allows transistors 16 and 18 to conduct more current, which translates to faster charge pumping. Transistors 26, 28, 34 and 36 may be larger than transistors 48 and 52. Transistor 36 may be larger than transistors 26, 28 and 34 to quickly pull down node 32. In the alternative, transistor 36 may be turned on longer to pull down node 32. Capacitor 10 is preferably larger than capacitor 12 since capacitor 12 is pumping only node 32.

The FIG. 1 embodiment provides a full −VCC at the drain of transistor 18 to a substrate. This would allow the preferred embodiment to be used unregulated in some applications requiring a full −VCC.

Any variation in VCC, down to approximately 2 V for the preferred embodiment, will still enable node 26 to achieve a voltage that is a p-channel threshold voltage $|V_{tp}|$ less than −VCC. It follows that the preferred embodiment of the present invention can tolerate a VCC as low as approximately 2 V. Further, since the preferred embodiment can operate with operating voltage as low as approximately 2 V, it will also operate with greater voltages and therefore tolerate a wider voltage range for VCC.

One skilled in the art should recognize that devices 12, 40, 46, 48, 50, 52, 54 and 58 form a single stage charge pump which can be replaced with other circuits without departing from the spirit of the present invention.

It would be appreciated that the foregoing description is directed to a preferred embodiment of the present invention, and that numerous modifications or alterations can be made without departing from the spirit or scope of the present invention.

What is claimed as the invention is:

1. A charge pump comprising:
   a secondary charge pump coupled to a first node;
   a first transistor having gate, source and drain electrodes wherein said gate electrode is coupled to said first node, said drain electrode is coupled to a substrate and said source electrode is coupled to a second node;
   a second transistor having gate, source and drain electrodes wherein said drain electrode is coupled to said second node, said source electrode is coupled to a first power supply and said gate electrode is coupled to a third node;
   a third transistor having gate, source and drain electrodes wherein said drain electrode and gate electrode are coupled to said first power supply, and said source electrode is coupled to said third node;
   a fourth transistor having gate, source and drain electrodes wherein said drain electrode is coupled to said first power supply, said source electrode is coupled to said third node, and said gate electrode is coupled to said first node;
   a fifth transistor 28 having gate, source and drain electrodes wherein said drain electrode is coupled to said first power supply, said source electrode is coupled to said third node, and said gate electrode is coupled to said secondary charge pump;
   a sixth transistor having gate, source and drain electrodes wherein said drain electrode is coupled to said first power supply, said source electrode is coupled to said first node, and said gate electrode is coupled to a fourth node;
   a seventh transistor having gate, source and drain electrodes wherein said drain electrode is coupled to said first power supply, said source electrode is coupled to said fourth node, and said gate electrode is coupled to said first node;
   a plurality of capacitors wherein said first, second, third and fourth nodes are coupled to respective ones of said plurality of capacitors, each of said capacitors coupled to receive respective clock pulses.

2. The device of claim 1 wherein said first, second, third, fourth, fifth, sixth and seventh transistors are P-type field-effect transistors.

3. The device of claim 1 wherein said capacitors are p-type field-effect transistors having gate, source and drain electrodes, said source and drain electrodes are coupled together.

4. The device of claim 1 wherein said secondary charge pump being comprised of P-type field-effect transistors.

5. A charge pump comprising:
   a first transistor having gate, source and drain electrodes wherein said gate electrode is coupled to a first node, said drain electrode is coupled to a first power supply and said source electrode is coupled to a second node;
   a second transistor having gate, source and drain electrodes wherein said drain electrode is coupled to said second node, said source electrode is coupled to a first power supply and said gate electrode is coupled to a third node;
   a third transistor having gate, source and drain electrodes wherein said drain electrode and gate electrode are coupled to said first power supply, and said source electrode is coupled to said third node;
   a fourth transistor having gate, source and drain electrodes wherein said drain electrode is coupled to said first power supply, said source electrode is coupled to said third node, and said gate electrode is coupled to said first node;
   a fifth transistor having gate, source and drain electrodes wherein said drain electrode is coupled to said first power supply, said source electrode is coupled to said third node, and said gate electrode is coupled to a fifth node;
   a sixth transistor having gate, source and drain electrodes wherein said drain electrode is coupled to said first power supply, said source electrode is coupled to said first node, and said gate electrode is coupled to a fourth node;
   a seventh transistor having gate, source and drain electrodes wherein said drain electrode is coupled to said first power supply, said source electrode is coupled to said fourth node, and said gate electrode is coupled to said first node;

a eighth transistor having gate, source and drain electrodes wherein said drain electrode is coupled to said first node, said source electrode is coupled to a sixth node, and said gate electrode is coupled to said fifth node;

a ninth transistor having gate, source and drain electrodes wherein said drain electrode is coupled to said first power supply, said source electrode is coupled to said fifth node, and said gate electrode is coupled to a seventh node;

an tenth transistor having gate, source and drain electrodes wherein said drain electrode is coupled to said first power supply, said source electrode is coupled to said seventh node, and said gate electrode is coupled to said fifth node;

a eleventh transistor having gate, source and drain electrodes wherein said drain electrode is coupled to said first power supply, said source electrode is coupled to said seventh node, and said gate electrode is coupled to said first power supply;

a twelfth transistor having gate, source and drain electrodes wherein said drain electrode is coupled to said sixth node, said source electrode is coupled to said first .power supply, and said gate electrode is coupled to said seventh node;

a plurality of capacitors wherein said first, second, third fourth, fifth, sixth and seventh nodes are coupled to respective ones of said plurality of capacitors, each of said capacitors coupled to receive respective clock pulses.

6. The device of claim 5 wherein said first, second, third fourth, fifth, sixth, seventh, eighth, ninth, tenth, eleventh and twelfth transistors are P-type field-effect transistors.

7. The device of claim 5 wherein said capacitors are p-type field-effect transistors having gate, source and drain electrodes, said source and drain electrodes are coupled together.

8. The device of claim 5 wherein said first and second transistors are larger than said eighth and twelfth transistors.

9. The device of claim 5 wherein said capacitor coupled to said second node is larger than said capacitor coupled to said sixth node.

10. A method of operating a charge pump comprising the steps of:

supplying a first voltage to a first switch, said first voltage controlling said first switch to couple a power supply to a first node, said first voltage having a magnitude of a threshold voltage less than a power supply voltage;

supplying a second voltage to said first node to increase the magnitude of a first node voltage; and supplying a third voltage to a second switch, said third voltage controlling said second switch to couple said first node to a second node, said third voltage having a magnitude of another threshold voltage less than said increased first node voltage, wherein said supplying said first, second and third voltages has a timing sequence so that the magnitude of said first node voltage is not increased while said first switch is coupling said power supply to said first node, and the magnitude of said first node voltage is not decreased while said second switch is coupling said first node to said second node.

11. The method of claim 10 wherein said steps are repeated.

12. A charge pump comprising:

a first transistor having a gate electrode, a first electrode and a second electrode wherein said gate electrode is coupled to a first node, said first electrode is coupled to a substrate and said second electrode is coupled to a second node, said second node further coupled to receive a clock pulse;

a second transistor having a gate electrode, a first electrode and a second electrode wherein said first electrode is coupled to said second node, said second electrode is coupled to a power supply and said gate electrode is coupled to a third node; and a voltage generating circuit coupled to said first and third nodes, said circuit provides first and second potentials to said first and third nodes, respectively, wherein a magnitude of said second potential being less than a magnitude of said power supply by a threshold value of said second transistor, and a magnitude of said first potential being less than a magnitude of said second node by a threshold value of said first transistor.

13. A device according to claim 12 wherein said voltage generating circuit comprises another charge pump and a plurality of transistors, said circuit coupled to receive said clock pulse and a plurality of clock pulses.

14. A device according to claim 12 further comprising a charge storage device coupled to receive said clock pulse and to said second node wherein said charge storage device provides a signal to said second node that follows said clock pulse.

15. A charge pump for pumping a substrate of an integrated circuit to a negative voltage, comprising:

a first, single-stage pump having a field effect transistor and a capacitor for transferring a first charge for pumping the substrate, said transistor having gate, source, and drain electrodes, said gate electrode being coupled to a first node, said drain electrode being. coupled to the substrate, said source electrode being coupled to a second node, said capacitor having at least one terminal coupled to said second node;

a second pump for transferring a second charge to said first node, so that said second charge is not transferred to said substrate, whereby said first pump can pump the substrate to a full −Vcc, where Vcc is an operating voltage.

16. The charge pump of claim 15 wherein said second charge from said second pump is smaller than said first charge from said first pump.

17. The charge pump of claim 15 wherein said transistor is a p-channel field effect transistor.

18. The charge pump of claim 15 wherein said second charge pump is a single-stage pump.

19. The charge pump of claim 15 wherein said capacitor has first and second terminals and comprises an MOS p-channel capacitor having gate, source, and drain electrodes, said gate electrode being said first terminal, and said source and drain electrodes being connected together to form said second terminal of said capacitor.

20. The charge pump of claim 15 wherein the charge pump is unregulated.

21. The charge pump of claim 15 wherein said capacitor is connected to receive clock signals which experience a voltage transition of Vcc.

* * * * *